US008214354B2

(12) United States Patent
Chong et al.

(10) Patent No.: US 8,214,354 B2
(45) Date of Patent: Jul. 3, 2012

(54) COLUMN CONSTRAINTS BASED ON ARBITRARY SETS OF OBJECTS

(75) Inventors: Eugene Inseok Chong, Concord, MA (US); Souripriya Das, Nashua, NH (US); George Eadon, Nashua, NH (US); Jagannathan Srinivasan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 155 days.

(21) Appl. No.: 11/395,652

(22) Filed: Mar. 31, 2006

(65) Prior Publication Data

US 2007/0233641 A1    Oct. 4, 2007

(51) Int. Cl.
G06F 7/00      (2006.01)
G06F 17/30    (2006.01)

(52) U.S. Cl. .................... 707/717; 707/718; 707/759
(58) Field of Classification Search .................. 707/100, 707/717, 718, 999.03, 999.02, 759
See application file for complete search history.

(56) References Cited

U.S. PATENT DOCUMENTS

| | | | |
|---|---|---|---|
| 6,449,609 B1* | 9/2002 | Witkowski | 1/1 |
| 6,502,088 B1* | 12/2002 | Gajda et al. | 707/2 |
| 2003/0158841 A1 | 8/2003 | Britton et al. | |
| 2005/0091180 A1* | 4/2005 | Peleg et al. | 707/1 |
| 2005/0267871 A1* | 12/2005 | Marchisio et al. | 707/3 |
| 2006/0004725 A1* | 1/2006 | Abraido-Fandino | 707/3 |
| 2006/0047696 A1* | 3/2006 | Larson et al. | 707/103 R |
| 2006/0161568 A1* | 7/2006 | Dettinger et al. | 707/101 |
| 2007/0112865 A1* | 5/2007 | Megerian | 707/200 |

FOREIGN PATENT DOCUMENTS

WO    2006 113499    10/2006

OTHER PUBLICATIONS

C.J. Date, "Database in Depth", May 2005, O'Reilly Media, Inc., Section 6.2.3.*
Jaroslav Pokorny, Modelling Stars Using XML, Nov. 2001, Proceedings of the 4th ACM International Workshop on Data Warehousing and OLAP, Atlanta, Georgia, p. 24-31.*
U.S. Appl. No. 10/916,547, Chong, et al.
U.S. Appl. No. 11/108,204, Das, et al.
Chong et al.: "Supporting Keyword Columns With Ontology-based Referential Constraints in DBMS".
Gregory Karvounarakis et al., "RQL: A Declaration Query Language for RDF", WWW2002. May 7-11, 2002, Honululu, Hawaii, USA.
Libby Miller, Andy Seaborne, Alberto Reggiori, "Three Implementations of SquishQL, a simple RDF Query Language", Apr. 26, 2002, HP Laboratories Bristol, www.hpt.Itechreports/2002/HPL-2002-11-.pdf.

(Continued)

*Primary Examiner* — Cam Truong
(74) *Attorney, Agent, or Firm* — Vista IP Law Group, LLP

(57) ABSTRACT

Techniques for using arbitrary sets of objects to constrain objects in database systems. The constraint set of objects is associated with the constrained object in the database system and the database system will perform an operation which adds an object to the constrained object only if the object being added belongs to the constraint set. In a preferred embodiment, the techniques are employed to obtain constraint sets of terms from ontologies which are then used to constrain columns containing those terms. An implementation of the techniques makes a materialized view out of the objects in the constraint set and uses the materialized view to define a referential integrity constraint on the constrained column.

37 Claims, 9 Drawing Sheets

OTHER PUBLICATIONS

Andy Seaborne "RDQL: A Query Language for RDF", W3C Member Submission Jan. 9, 2004; http://www.w3.org/Submission/2004/SUBM-RDQL-20040109.

"RDFQL Database Command Reference", RDF Gateway http://www.intellidimension.com/default.rsp?topic=/pages/rdfgateway/reference/db/default.rsp.

"SPARQL Query Langauge for RDF", W3C Working Draft, Oct. 12, 2004, http://www.w3.org/TR/2004/WD-rdf-sparql-query-20041012/.

Stephen Harris et al., "3store: Efficient Bulk RDF Storage", Oct. 2003, pp. 1-15, Proceedings of the 1st International Workshop on Practical and Scalable Emantic Systems, Sanibel Island, Florida.

Souripriya Das et al., "Supporting Ontology-Based Semantic Matching in RDBMS", Proceedings of the 13th International Conference on Very Large Data Bases, Aug. 2004, pp. 1054-1065, Toronto, Canada.

International Preliminary Report on Patentability for Application No. PCT/US2006/014196.

Written Opinion of the International Seraching Authority for Application No. PCT/US2006/014196 Mailed on Mar. 13, 2007.

International Search Report for Application No. PCT/US2006/014196 Mailed on Mar. 13, 2007.

Non-Final Office Action dated Nov. 6, 2008 for U.S. Appl. No. 11/108,204.

Non-Final Office Action dated Jul. 12, 2007 for U.S. Appl. No. 11/108,204.

Final Office Action dated Jul. 1, 2009 for U.S. Appl. No. 11/108,204.

Final Office Action dated Feb. 5, 2008 for U.S. Appl. No. 11/108,204.

* cited by examiner

RDF query 301

```
            SELECT t.r reviewer, t.c conf, t.a age
            FROM TABLE(RDF_MATCH(
                '(?r  rdf:type    Student)
                 (?r  ReviewerOf  ?c)
                 (?r  Age         ?a)',
              RDFModels ('reviewers'),
              NULL, NULL)) t ———— 312
            WHERE t.a < 25;
```

303 { 305 { 307 { ... 309 ... 311 313 ... 304

| Student reviewer (r) | Conf (c)  | c$type | Age(a) | A$type  |
|----------------------|-----------|--------|--------|---------|
| John                 | ICDE 2005 | URI    | 24     | xsd:int |
| Tom                  | ICDE 2005 | URI    | 22     | xsd:int |
| Gary                 | VLDB 2005 | URI    | 23     | xsd:int |
| Bob                  | VLDB 2005 | URI    | 21     | xsd:int | rows 316 returned by RDF_Match 305

| Student reviewer (r) | Conf (c)  | Age(a) |
|----------------------|-----------|--------|
| John                 | ICDE 2005 | 24     |
| Tom                  | ICDE 2005 | 22     |
| Gary                 | VLDB 2005 | 23     |
| Bob                  | VLDB 2005 | 21     | result rows 314 returned by SELECT statement 303

```
405 ALTER TABLE EMP
407 ADD CONSTRAINT dept_constraint
409 FOREIGN KEY (DNAME)
411 REFERENCES (SELECT Term1Name
413           FROM TABLE (ONT_EXPAND (
415                 NULL,
417              'rdfs:subClassOf',
419              'Management',
421              'Deparment_Ontology')));
```

423

```
425 ALTER TABLE JOURNAL
427 ADD CONSTRAINT chemical_constraint
429 FOREIGN KEY (checmical_compounds)
431 REFERENCES ( SELECT t.r
433           FROM TABLE (RDF_MATCH (
435                 '(?r rdfs:subClassOf Macromolecules)',
437              RDFModels ('BioCyc'),
439              RDFRules ('rdfs'), NULL)) t);
```

443

```
445 REFERENCES ( SELECT t.r
447        FROM TABLE (RDF_MATCH (
449              '(?r rdfs:subClassOf Proteins)
451        (?r rdfs:subClassOf Complexes)',
455        RDFModels ('BioCyc'),
457        RDFRules ('rdfs'), NULL)) t);
```

FIG. 4

```
                            601
405 ALTER TABLE EMP
407 ADD CONSTRAINT dept_constraint
409 FOREIGN KEY (DNAME)
411 REFERENCES (SELECT Term1Name
413           FROM TABLE (ONT_EXPAND (
415                  NULL,
417                  'rdfs:subClassOf',
419                  'Management',
421                  'Deparment_Ontology')))
603 ON DELETE SET NULL;

605
405 ALTER TABLE EMP
407 ADD CONSTRAINT dept_constraint
409 FOREIGN KEY (DNAME)
411 REFERENCES (SELECT Term1Name
413           FROM TABLE (ONT_EXPAND (
415                  NULL,
417                  'rdfs:subClassOf',
419                  'Management',
421                  'Deparment_Ontology')))
609 ON DELETE TRANSFORM USING find_broader_term;

610
611 function find_broader_term ($O_{old}$, $R_{new}$, dterm) {
613      SELECT object
615      FROM   $O_{old}$
617         START WITH subject = dterm
619           CONNECT BY PRIOR object = subject
621           AND (PRIOR object NOT IN $R_{new}$);
623 }

625
405 ALTER TABLE EMP
407 ADD CONSTRAINT dept_constraint
409 FOREIGN KEY (DNAME)
411 REFERENCES (SELECT Term1Name
413           FROM TABLE (ONT_EXPAND (
415                  NULL,
417                  'rdfs:subClassOf',
419                  'Management',
421                  'Deparment_Ontology')))
627 ON INSERT RECOMMEND USING find_refined_term;
```

| EMPNO | NAME | JOB | MGR | DNAME |
|---|---|---|---|---|
| 0001 | SMITH | CEO | | MANAGEMENT |
| 0035 | JONES | VP ENG | 0001 | ENGINEERING |
| 1398 | JACKSON | VP SALES | 0001 | SALES |
| 2005 | PETERSON | SALESMAN | 1398 | SALES |
| 2006 | HAMILL | VP MANUFAC | 0001 | MANUFACTURING |
| 2010 | HALTER | MANAGER | 0035 | HARDWARE |
| 2013 | SHARMA | QA SPECIALIST | 2010 | QUALITY ASSURANCE |

703

| EMPNO | NAME | JOB | MGR | DNAME |
|---|---|---|---|---|
| 0001 | SMITH | CEO | | MANAGEMENT |
| 0035 | JONES | VP ENG | 0001 | ENGINEERING |
| 1398 | JACKSON | VP SALES | 0001 | SALES |
| 2005 | PETERSON | SALESMAN | 1398 | SALES |
| 2006 | HAMILL | VP MANUFAC | 0001 | |
| 2010 | HALTER | MANAGER | 0035 | HARDWARE |
| 2013 | SHARMA | QA SPECIALIST | 1010 | QUALITY ASSURANCE |

— 705

707

| EMPNO | NAME | JOB | MGR | DNAME |
|---|---|---|---|---|
| 0001 | SMITH | CEO | | MANAGEMENT |
| 0035 | JONES | VP ENG | 0001 | ENGINEERING |
| 1398 | JACKSON | VP SALES | 0001 | SALES |
| 2005 | PETERSON | SALESMAN | 1398 | SALES |
| 2006 | HAMILL | VP MANUFAC | 0001 | MANUFACTURING |
| 2010 | HALTER | MANAGER | 0035 | ENGINEERING |
| 2013 | SHARMA | QA SPECIALIST | 1010 | ENGINEERING |

— 709

711

| RowId | Term | Recommendations | Action |
|---|---|---|---|
| 2013 | Quality Assurance | ENGINEERING | Delete |
| 2013 | Quality Assurance | MANUFACTURING | Delete |
| 2010 | HARDWARE | Board Design | Insert |
| 2010 | HARDWARE | Chip Design | Insert |

COLUMN CONSTRAINTS BASED ON ARBITRARY SETS OF OBJECTS

CROSS-REFERENCE TO RELATED APPLICATIONS

U.S. Ser. No. 10/916,547, System for ontology-based semantic matching in a relational database system, which has the same inventors and assignee as the present patent application and U.S. Ser. No. 11/108,204, Integrating RDF data into a relational database system, which has the same inventors and assignee as the present patent application are hereby incorporated by reference into this patent application for all purposes.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates generally to database management systems and more particularly to techniques for defining constraints on columns in database management systems.

2. Description of Related Art

Relational database systems have become increasingly robust with many features that insure the integrity of the data stored within the columns of tables of a database instance. The means of ensuring the integrity of data are a set of business rules defined by the application developer and are referred to as Integrity Constraints in the database system.

There are many types of integrity constraints; the most relevant type for the present discussion is referential integrity constraints. A referential integrity constraint is a constraint which maintains consistency between coupled tables. A value from a key column in a first one of the coupled tables is used as a value in a non-key column of a second one of the coupled tables. The value from the key column is termed the parent key; the key value in the non-key column of the other table is termed the foreign key. A referential integrity constraint requires that every foreign key value in the non-key column of the second table have a value which is equal to the value of one of the keys in the key column. A consequence of the rule is that when keys are added to or deleted from the key column in the first table, there may be effects on the foreign key values in the second table. The rules for dealing with these effects are:

Restrict: Disallows the update or deletion of parent keys.
Set to Null: When a parent key is updated or deleted, all of the foreign keys which have that value are set to NULL.
Set to Default: When a parent key is updated or deleted, the foreign keys which have the value are all set to a default value.
Cascade: When a parent key is updated, all foreign keys which had the old value are correspondingly updated. When a row containing a parent key is deleted, all rows having foreign keys with the parent key's value are deleted.
No Action: Disallows the update or deletion of parent keys. This differs from RESTRICT in that it is checked at the end of the execution of the SQL statement that makes the change statement, or at the end of the transaction to which the execution of the SQL statement belongs if enforcement of the constraint is deferred until then.

FIG. 1 shows a set of tables which will be used in the following to demonstrate referential integrity constraints. Table EMP 105 has five columns that define the employee within the context of his employment.

Tables 103 and 105 are coupled by a referential constraint, as shown by arrow 104. The primary key values in column DNAME 109(i) are parent keys. The foreign keys which have the values of the parent keys are values in column DNAME 109(ii). The referential integrity constraint guarantees that every value in the column 109(ii) already exists as a value in the column 109(i). Because of the constraint, the relational database system handles inserts in a manner that ensures data integrity. Insert 107 violates the referential integrity constraint in that the value 'MARKETING' for the column DNAME 109(ii) cannot be found in the rows of column 109(i). The referential integrity constraint further enforces rules concerning what occurs in EMP table 105 when a row containing a DNAME 109(ii) has the corresponding row deleted from DEPT table 103.

What a referential constraint does in general terms is constrain DNAME column 109(ii) such that all of the values in DNAME column 109(ii) must be selected from the set of values defined by the values of DNAME column 109(i). There are many contexts other than parent keys and foreign keys where it would be desirable to constrain a column such that the values in the column had to be selected from a dynamic set of values, that is, a set of values whose member values were not known until the time the constraint was enforced. In the following, such constraints will be generically termed dynamic set constraints. At present, the only dynamic set constraints which are supported in relational database systems are referential constraints. It is an object of the invention disclosed herein to provide a relational database system which supports other kinds of dynamic set constraints.

One kind of dynamic set constraint which is particularly useful is one in which the dynamic set is a set of terms that belong to a domain in an ontology. For purposes of the following discussion, ontology and domain are defined as follows:

An ontology defines the terms used to describe and represent an area of knowledge. Ontologies are used by people, databases, and applications that need to share domain information (a domain is just a specific subject area or area of knowledge, like medicine, tool manufacturing, real estate, automobile repair, financial management, etc.). Ontologies include computer-usable definitions of basic concepts in the domain and the relationships among them. They encode knowledge in a domain and also knowledge that spans domains. In this way, they make that knowledge reusable (From OWL Web Ontology Language Use Cases and Requirements. W3C Recommendation (10 Feb. 2004). Jeff Heflin, editor)

FIG. 2 shows a graph depicting an illustrative ontology that represents the relationships between departments of a company. Each node of the graph represents a department. The arcs connecting the nodes represent relationships between the nodes. Here, all of the arcs represent the relationship "subDepartmentOf" 204 (modeled using the subClassOf property) i.e., the node at the lower end of the arc is a subdepartment of the node at the upper end. Department_Ontology 201 begins with a Management department node 203. Engineering 205, Sales 207, and Manufacturing 209 represent subdepartments of the Management department node 203. These nodes have further sub-nodes which represent lower level departments. The ontology defines various sets of departments. For example, the set of all the departments is all the departments which have nodes in the graph. The set of engineering departments is Engineering 205 and its subdepartments Software and Hardware.

As will be explained in more detail below, a set of departments defined in the ontology may be used as a constraint on column DNAME 109(i) or on column DNAME 109(ii). For example, if EMP table 105 were a table of engineering employees, column DNAME 109(ii) could be constrained such that a row for an employee could be added to the table only if his or her department was Engineering, Software, or Hardware.

Within the RDBMS, an ontology can be represented using Resource Description Framework (RDF). RDF is a language that was originally developed for representing information (metadata) about resources in the World Wide Web. It may, however, be used for representing information about absolutely anything, including ontologies. U.S. Ser. No. 11/108, 204, Integrating RDF data into a relational database system, discloses how this may be done.

U.S. Ser. No. 11/108,204 discloses the integration of RDF into SQL by means of a set of tables and user objects that represent RDF data sets and a table function RDF_MATCH that takes a specification of an RDF data set and an RDF pattern as parameters and returns a set of result rows of triples from the RDF data set that match the RDF pattern. The solution of the RDF pattern may include inferencing based on RDFS and user-defined rules.

The signature of RDF_MATCH is as follows:

| RDF_MATCH ( | |
|---|---|
| Pattern | VARCHAR, |
| Models | RDFModels, |
| RuleBases | RDFRules, |
| Aliases | RDFAliases, |
| ) | |
| RETURNS AnyDataSet; | |

FIG. 3 shows an SQL SELECT statement that includes an RDF_MATCH function invocation at 305. The RDF data from which the function invocation will return triples is shown at 223 in FIG. 2. The first parameter is one or more character strings 307 that indicate the RDF pattern to be used for the query. Each character string specifies a template which the set of RDF triples returned by the query must match. The notation ?<name> indicates that the template will be matched by any RDF triple which satisfies the rest of the character string. Thus, ?r rdf:type STUDENT matches any triple having the type STUDENT. The triples returned are the ones that satisfy the AND of the templates; thus the pattern at 307 specifies that triples be returned for students of any age that are reviewers of papers for any conference. This set of triples is shown at 316. The remaining parameters specify the RDF data set to be queried. Models specifies the data set's RDF models, in the case of invocation 305, the Reviewers model, as indicated at 309, RuleBases specifies rule bases that contain the RDF rules that apply to the models, and Aliases specify any aliases that apply to the RDF data set. These parameters are set to NULL in invocation 307. As is true with any table function, RDF_MATCH returns a set of result rows. Here, the result rows describe an RDF graph that is a subgraph of the graph represented by the RDF dataset (including rulebases) against which the query has been posed.

It should be noted that the contents of the result rows returned by RDF_MATCH will depend on the RDF pattern used in the query and the RDF data against which the query is run. For this reason, the return type for RDF_MATCH has been defined as AnyDataSet, which is a collection of tuples of a generic type called AnyData. When an SQL query employs the RDF_MATCH table function, components of the query such as its SELECT, WHERE, ORDER BY, etc., clauses can reference the variables present in the RDF pattern simply by the variable names.

An advantage of using the RDF_MATCH table function in a SELECT statement to query RDF data is that any SQL construct that can be used with a SELECT statement can be used to further process the result rows 316 returned by RDF_MATCH. These constructs include iterating over the result rows, aggregating values contained in the result rows, constraining the result rows using WHERE clause predicates, sorting the result rows using ORDER BY clauses, and limiting the result rows by using the ROWNUM clause. Also, the SQL set operations can be used to combine result sets of two or more invocations of RDF_MATCH. In SELECT statement 303, the WHERE clause limits the triples to those for students whose age is less than 25. The output of the SELECT statement is shown at 314.

An Ontology can be accessed using the new SQL operators disclosed in U.S. Ser. No. 10/916,547, System for ontology-based semantic matching in a relational database system. The new operators are named ONT_RELATED, ONT_EXPAND, ONT_DISTANCE, and ONT_PATH. These operators may be used directly in SQL statements, and thus allow database users to combine these semantic matching operators with other conventional SQL operations such as joins to make use of the full expressive power of SQL while performing semantic based matching. Prior to executing a query containing the semantic matching operator, the specified ontology is expressed in RDF and represented in the database system as described in U.S. Ser. No. 11/208,204. The operators, explained using ontology 201 of FIG. 2, are the following:

The ONT_RELATED operator performs ontology-based semantic matching and is expressed within an SQL statement using an expression of the form: "ONT_RELATED (term1, reltype, term2, ontology)." When executed, the ONT_RELATED operator determines whether the two input terms (term1 and term2) are related by the specified relationship type "reltype" by consulting the ontology. Thus, ONT_RELATED (Software, subDepartmentOf, Management, Department_Ontology) will return TRUE, because the subDepartmentOf relationship (modeled using subClassOf property) is transitive, and consequently, if Software is a subdepartment of Engineering and Engineering is a subdepartment of Management, then Software is a subdepartment of Management as well.

Two ancillary operators, ONT_PATH and ONT_DISTANCE, are employed to determine additional measures for pairs of terms belonging to the ontology, namely, the shortest path connecting two terms and the length of the shortest path, respectively.

The ONT_EXPAND Operator.

This operator returns rows representing a set of terms in the ontology. The terms to be returned are indicated by parameters that specify a first term, a second term, and a relationship between the first and second term. The specified relationship may be either a simple relationship or combination of them. The following is an example of the operator's declaration:

```
CREATE TYPE ONT_TermRelType AS OBJECT (
    Term1Name VARCHAR(32),
    PropertyName VARCHAR(32),
    Term2Name VARCHAR(32),
    TermDistance NUMBER,
    TermPath VARCHAR(2000)
);
        CREATE TYPE ONT_TermRelTableType AS TABLE OF
ONT_TermRelType;
    ONT_EXPAND (Term1, RelType, Term2, OntologyName
    ) RETURNS ONT_TermRelTableType;
```

Typically, non-NULL values for RelType and Term2 are specified as input and then the operator computes all the appropriate <Term1, RelType, Term2> tuples in the closure taking into account the characteristics (transitivity and symmetry) of the specified RelType. In addition, it also computes the relationship measures in terms of distance (TermDistance) and path (TermPath). For cases when a term is related to input term by multiple paths, one row per path is returned. It is also possible that ONT_EXPAND invocation may specify input values for any one or more of the three parameters or even none of the three parameters. In each of these cases, the appropriate set of <Term1, RelType, Term2> tuples is returned.

The term1, reltype, and term2 can have either a specific input value or NULL value. The NULL means all possible values. For example, ONT_EXPAND (NULL, subDepartmentOf, Engineering, Department_Ontology) will generate all nodes that are related by the subDepartmentOf relationship to the node Engineering, namely the nodes Software and Hardware.

Objects of the invention include providing techniques for defining column constraints in terms of arbitrary sets of values and providing techniques for dealing with the effects of changes in the set of values used to define the constraint on the values in the column subject to the constraint, as well as providing techniques for defining column constraints in terms of sets of values obtained by queries on ontologies.

BRIEF SUMMARY OF THE INVENTION

The objects of the invention are obtained by a technique that is used in the database system to associate a constrained object with an arbitrary constraint set of objects that are possible values of the constrained object. When an operation in the database system adds a value to the constrained object, the operation is permitted only if the added value is a member of the constraint set. The constraint set may be specified by a query that is executed in the database system. The query may include a table function.

In one aspect, the technique employs referential integrity constraint mechanisms provided by the database system. The constrained object is a column that is defined in the database system. The technique makes a materialized view with a column whose values are members of the constraint set and then uses the materialized view to define a referential integrity constraint for the constrained column.

In another aspect, when an operation in the database system results in a new constraint set, a variety of responses may be specified when the constraint set is associated with the constrained object. Operations that alter the constraint set may be barred or the database system may change values in the constrained object when the constraint set is altered. Changes may include setting a value which is in the constrained object but not in the new constraint set to NULL, setting it to a default value, and using a transform function to transform a value which is not in the new constraint set into a value which is in the new constraint set. The transform function may return a number of possibilities for transforming a value which is not in the new constraint set. In that case, the techniques permit user selection of one of the possibilities.

The constraint set may be derived from any source of objects; however, in one species of the invention, the constraint set is a set of terms from an ontology. The query that is used to obtain the constraint set from the ontology returns terms that stand in a defined relationship to each other in the ontology and the constraint set is used to limit terms in a keyword column to terms that belong to the part of the ontology that was returned by the query.

Other objects and advantages will be apparent to those skilled in the arts to which the invention pertains upon perusal of the following Detailed Description and drawing, wherein:

BRIEF DESCRIPTION OF THE SEVERAL VIEWS OF THE DRAWINGS

FIG. 3 Shows a prior art use of Resource Description Framework (RDF) in a database system;

FIG. 4 Shows an SQL statement that creates an ontology-based referential constraint;

FIG. 6 Shows a set of SQL statement creating referential constraints;

FIG. 7 Shows the transformation of a table when data is modified in an underlying ontology;

Figure 1:
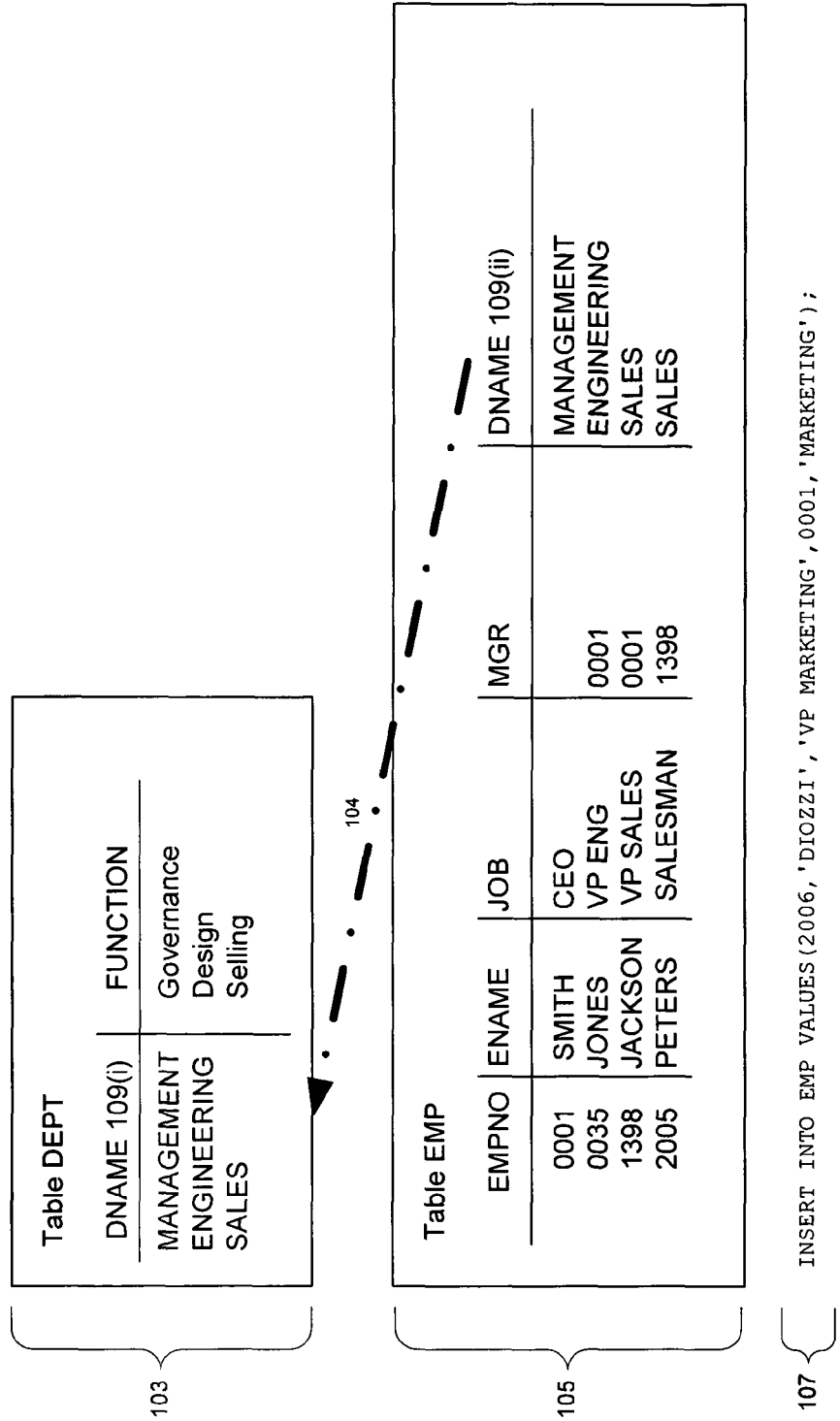
FIG. 1 Shows a set of tables upon which integrity constraints are used.
Figure 2:
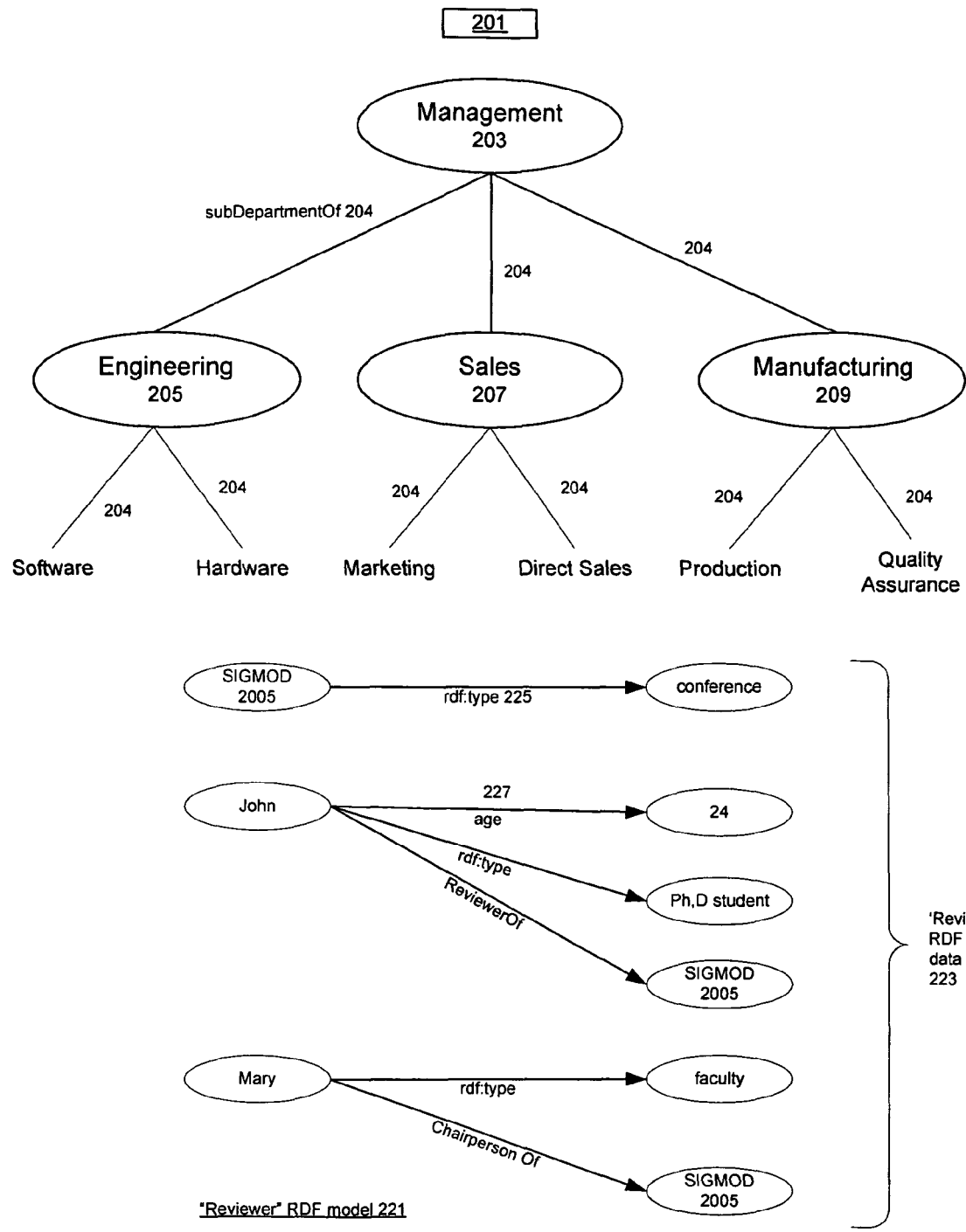
FIG. 2 Shows a graph depicting an illustrative ontology that defines hierarchical relationships between departments of a company.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

The following Detailed description will first present an overview of a species of the invention in which the set of objects that is used to constrain the column is obtained from an ontology and will then present details of a preferred embodiment of the species. In the following, the species will be termed an "ontology-based referential constraint".

Ontology-Based Referential Constraints

Traditional referential integrity constraints are specified by SQL syntax of the form '<column a> REFERENCES <table b> (<column c>)', where <column a> is a foreign key and <column c> contains parent keys in <table b>. The database system ensures that the <column a> only contains values that are also present in <column c>.

This SQL syntax is extended to support ontology-based referential integrity constraints as follows:

<column a> REFERENCES (<ontology query>)

FIG. 4 shows an SQL statement 401 that creates an ontology-based referential constraint. Statement 401 begins at line 405 by specifying that table EMP 105 is to be altered. Line 407 indicates that the alteration is the addition of a constraint named dept_constraint. The constraint is added to the data dictionary of the database system. Line 409 constrains column DNAME 109(*ii*) in EMP 105. Line 411 specifies that column DNAME 109(*ii*) is constrained by a set of objects which is returned by the query specified in the SELECT statement of line 411. That query returns the set of those department names from ontology 201 that have a subClassOf relationship to Management node 203. The set of department names returned by the query is obtained using the ONT_EXPAND function. The function is applied to an RDF representation of ontology 201; in terms of that representation, the parameters at lines 415-419 are equivalent to an RDF pattern that contains a single triple; the triple specifies all nodes of the ontology that are in a subClassOf relationship to Management node 203.

While ONT_EXPAND provides a useful functionality, its parameters are limited to expressing an RDF pattern that contains a single triple. The RDF_MATCH table function can be used for RDF patterns containing more than one triple. For example, assume that a user of a database system wants to create a journal article table for journal articles concerning macromolecules. The table will have a row for each journal article. The table's columns will include a column <chemical_compound> whose values are keywords for the classes of chemical compounds that the articles are written about, such as 'Proteins' and 'Polypeptides'. The values contained in the column chemical_compounds are to be taken from terms which are subclasses of the class Macromolecules in the Pathway/Genome ontology BioCyc, see www.biopax.org.

SQL statement 423 creates an ontology-based referential constraint which limits the terms used in the column chemical_compound to terms which are in fact subclasses of the class Macromolecules in the ontology. The referential constraint's SELECT clause uses the RDF_MATCH table function with an RDF pattern consisting of a single triple that returns all terms that are subclasses of Macromolecules.

If the user wants to further restrict the <chemical compounds> column to compounds that are subclasses of both the class 'Proteins' and the class 'Complexes', the user may issue a query like query 443. There, the RDF pattern used in RDF_MATCH at 447 contains two triples. The terms that satisfy the pattern are terms that are subclasses of both 'Proteins' and 'Complexes' 451. In the following, a column which is subject to dynamic set constraint such as an ontology-based referential constraint will be termed a constrained column and the set of objects which constrains the values in the constrained column will be termed the constraint set. Though the constraint set may come from any source, it is typically the result of a query.

Figure 5:
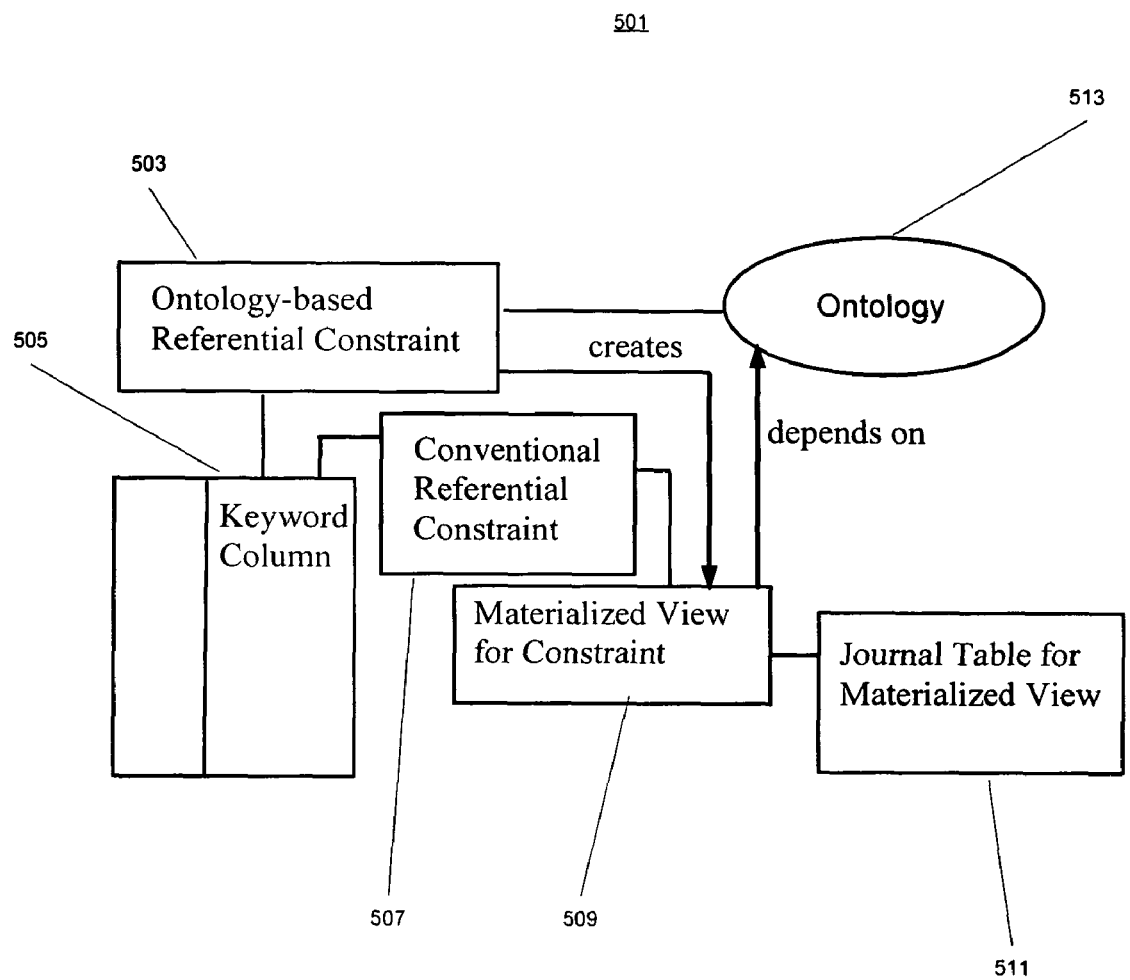
FIG. 5 Shows a diagram of the components of an ontology-based referential constraint.

An Efficient Implementation of Ontology-Based Referential Constraints: FIG. 5

A naïve implementation of an ontology-based referential constraint is inefficient in that each insert or update of a value in a column that is subject to the ontology-based referential constraint requires the execution of a query on the ontology to produce a constraint set from which the database system may determine whether the inserted or updated value violates the constraint. To allow for more efficient processing of inserts and updates subject to ontology-based referential constraints, a materialized view is used to store the constraint set in persistent storage.

In a relational database system, the execution of a SELECT statement returns a table containing the results of the query defined by the SELECT statement. The table returned by the query is termed a view. Ordinarily, a view is stored in non-persistent storage. A materialized view is a view whose data is stored in persistent storage. Because the materialized view is stored in persistent storage, the materialized view has an entry in the database system's data dictionary and the values in a column of the materialized view may serve as parent keys for a standard referential constraint.

Constraint enforcement diagram 501 shows how a materialized view and a standard referential constraint may be used to implement an ontology-based referential constraint. Keyword column 505 is constrained by an ontology-based referential constraint 503. Ontology-based referential constraint 503 executes a query against ontology 513. The result set returned by the query is the ontology-based referential constraint's constraint set. The constraint set is made into a materialized view 509. The materialized view is a table with a single column that contains the values of the constraint set. A conventional referential constraint 507 is then defined for keyword column 505 in which the terms in the single column of the materialized view are the parent keys for the terms in keyword column 505. Conventional referential constraint 507 is then enforced on keyword column 505 in the usual fashion: Whenever a new value appears in keyword column 505, conventional referential constraint 507 is enforced based on the contents of materialized view 509. As will be explained in more detail later, Journal Table 511 records changes to materialized view 511. It is used when ontology 513 is modified.

It should be pointed out here that the technique of FIG. 5 is general and can be used to implement any kind of dynamic set constraint. All that is required is a mechanism for making the values of the dynamic set constraint's constraint set into an RDBMS view. Once that has been done, the view can be materialized and the dynamic set constraint can be implemented using the conventional referential constraint.

Ontology Update Semantics: FIGS. 6-7

When an ontology that provides constraint sets is modified, the constraint sets may get modified as a result and then, to maintain the referential integrity constraints, changes may need to be made to the columns that are constrained by the constraint sets. The present invention provides techniques for handing any such changes that may become necessary due to modifications to constraint sets caused by modifications of ontology data. The techniques are supported by extensions to the SQL statements that define ontology-based referential constraints which permit the user to define actions to be performed on values in the constrained column when modification of the ontology results in constraint set modification. These extensions have the form:

'ON DELETE RESTRICT': This option bars changes to the ontology that would remove referenced terms from the constraint query result set.

'ON DELETE SET NULL': When a value is removed from the constraint set, this option sets the matching values in the constrained column to NULL.

'ON DELETE TRANSFORM USING <function>': When a value is removed from the constraint set, this option replaces the matching value in the constrained column with the term returned by <function> whenever <function> returns a single term. If the deleted value cannot be unambiguously replaced, then the values that match the deleted value in the constrained column are set to NULL. In addition, tuples specifying <rowid_containing_deleted_term, deleted_term, returned_values, 'Delete'> are stored in a RECOMMENDATIONS table 711 as possible refinement suggestions for the user.

'ON INSERT RECOMMEND USING <function>'. When a value gets added to the constraint set, this option provides recommendations for values in the constrained column which may be replaced by the newly inserted value. This information is stored in RECOMMENDATIONS table 711 in the form of the tuple <NULL, inserted_term, replacement_terms, 'Insert'>.

Ontology-based referential constraint definition 601 is referential constraint definition 401 with the addition of the 'ON DELETE' clause 603. Clause 603 specifies that on deletion of an element from the constraint set (caused by modification to Department_Ontology 201) a value in the column DNAME in the user table EMP 701 which is the same as the value that is being deleted from the constraint set will be replaced with a NULL value. EMP table 701 contains a number of records where the DNAME column contains the value Manufacturing belonging to the constraint set. A delete from ontology 201 of the MANUFACTURING department will result in deletion of the MANUFACTURING department from the constraint set and this will cause the clause 603 to be executed. The execution will search for the value MANUFACTURING in the column DNAME of user table EMP 701 and set them to NULL, as shown at 705 in updated EMP table 703.

Referential constraint definition 605 is a version of referential constraint definition 601 wherein 'ON DELETE TRANSFORM' clause 609 is being used to specify that a function find_broader_term be executed on a deletion from the constraint set (caused by a modification of Department_Ontology 201). Function find_broader_term 610 finds a term which is still in the ontology and which is broader than the deleted term. The function is defined at line 611 and receives as input arguments $O_{old}$, $R_{new}$) and dterm. $O_{old}$ is the ontology prior to modification. $R_{new}$ is the constraint set after modification of the ontology, and dterm is the value of the deleted value. Function find_broader_term 609 starts at line 613 by applying the deleted term to the constraint set $O_{old}$ (615), starting from the position of the deleted term in $O_{old}$ and moving up $O_{old}$ until it finds a broader term that is in $R_{new}$. The function returns a result set of the nearest ancestors in $R_{new}$ of the value deleted from the ontology (623. The returned result set could be NULL, indicating no replacements could be found, or a (possibly singleton) subset of $R_{new}$. If a single replacement value is returned by the function, then the actual replacement can take place, automatically updating table 701. Otherwise, the set of replacement values may be stored in recommendation table 711.

Using ontology 201 as an example, deleting the 'Quality Assurance' department from the ontology leads to deletion of that term from the constraint set and that results in a search for broader terms. The search would return the next broader term, which is MANUFACTURING 209, to replace 'Quality Assurance' in updated EMP table 707. If more than one possible term were returned by the function, for example, if 'Quality Assurance' reported to more than one department, perhaps MANUFACTURING, then the two possible changes 713-715 would be inserted into recommendation table 711.

Changes to the ontology may cause insertion of terms into the constraint set and this may also cause a search for recommendations to replace current data. For example, if two new departments are added to Department_Ontology 201 under Hardware, that results in addition of those two departments into the constraint set, then a recommendation based on results returned by find_refined_term 627 of referential constraint definition 625 is executed. The addition of the two new departments causes recommendation table 711 to have the two departments 'Board Design' 717 and 'Chip Design' 719 added as possible new values of the DNAME column in the row for employee 2010, who was previously listed as belonging to Hardware.

Figure 8:
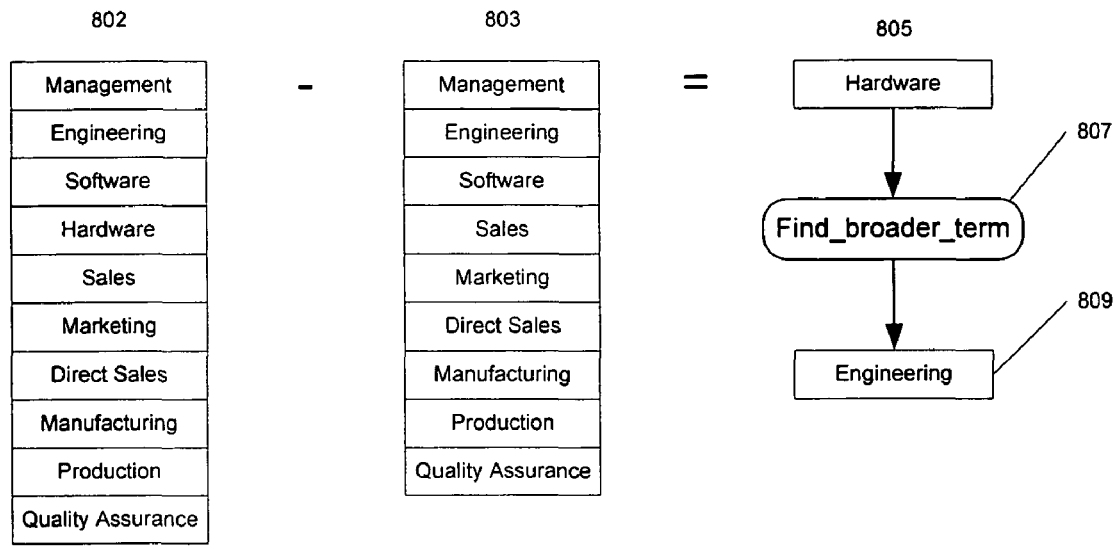
FIG. 8 Shows the selection of a new value of a value of a column when the column is subject to a ontology-based referential constraint.
Figure 9:
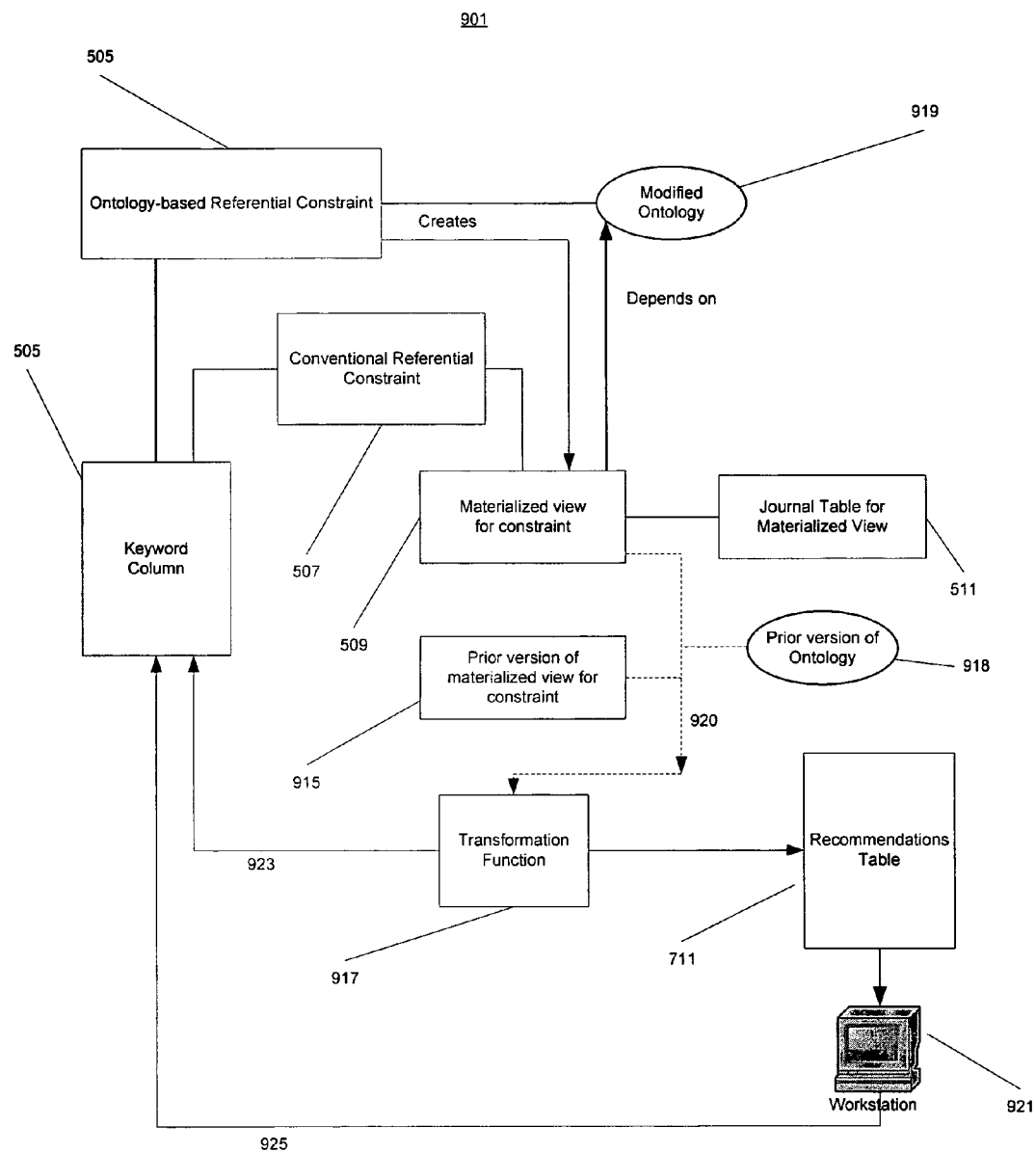
FIG. 9 Shows a diagram of the components of an ontology-based referential constraint which deal with modifications of the ontology.

Techniques for Modifying Ontologies and Enforcing the Consequences of the Modifications Modifications of ontologies and the resulting modifications to the values in the constrained column can be done either in batch or incrementally. Batch modification of the values of the constrained column in response to a modification of the ontology is termed in the following batch enforcement of the constraint. In batch enforcement, the ontology-based referential constraint is disabled during batch enforcement and reenabled thereafter. With incremental enforcement of the constraint, enforcement remains enabled but is deferred until changes to the ontology are committed.
Batch Enforcement: FIGS. 8-9

For batch enforcement, additional processing is needed for both DISABLE and ENABLE constraint operations. The details are described below.

DISABLE constraint: When the ontology-based constraint is disabled, a copy of current materialized view 509 is created. The copy is subsequently used to identify changes in the constraint set resulting from the modification of the ontology. Also saved is current version information for the ontology.

ENABLE constraint: Let R0 be the copy of materialized view 509 made when the constraint was last disabled, and R1 be the current constraint set. We determine the set of deleted terms using the following query:

```
SELECT term FROM R0
MINUS
SELECT term FROM R1
```

If the constraint has a transformation function associated with it, the transformation function is invoked for the deleted terms and the ontology version that existed when the constraint was disabled. If the transformation function yields a single result ($T_{new}$) for a deleted term ($T_{old}$), then update all instances of $T_{old}$ in the constrained column to $T_{new}$. If the transformation function yields either no terms or multiple terms, then the ROWIDs of all rows in the table with the constrained column in which the value in the constrained column is equal to $T_{old}$ are recorded in the recommendations table along with the transformation function results before all instances of $T_{old}$ in the keyword column are updated to NULL. If the constraint does not have a transformation function, then all instances of $T_{old}$ in the keyword column are updated to NULL.

R0, the copy of materialized view 509 made prior to the modification of ontology 201, is shown at 802. Then ontology 201 is modified by removing the department "Hardware" is removed from ontology 201. The result of the query of modified ontology 201 produces constraint set 803, which is the constraint set represented by R1. The difference of R0 (802) and R1 (803) is result set 805, which contains the deleted term Hardware. If the transformation function find_broader_term 807 is passed result set 805, it produces a single new term, namely Engineering 809. Table EMP 105's DNAME column 109(*ii*) is now constrained by result set R1 803. Consequently, in each row of table EMP which has the term Hardware 805 in the column DNAME, Hardware 805 is replaced with Engineering 809.

Similarly, to determine the effect of insertions into the ontology on the constraint set, the following query is used.

```
SELECT term FROM R1
MINUS
SELECT term FROM R0
```

If the constraint has a refinement function we invoke it for these terms. The refinement function's results are stored in the recommendations table.

FIG. 9 is a version 901 of the block diagram of FIG. 5 which shows the additional components required for dealing with modifications to ontology 513. After a modification to ontology 513, the modified ontology 919 must be queried to obtain a new constraint set, a materialized view 509 must be made from the new constraint set, and constrained column 505 must be modified as required for the new constraint set. The new components include prior version of the materialized view for the constraint, which is made before modifying the ontology, prior version of the ontology 918, which is also made prior to the modification, transformation function 917, and recommendations table 711. Materialized view 509, which is the current version of the constraint set, prior version 915, and prior ontology version 918 may all serve as inputs 920 to transformation function 917, which determines how values in constrained column 505 are to be altered to be in conformity with the constraint set defined by current materialized view 509. If transformation function 917 can find no substitution of a value in current materialized view 509 for a value which is not presently in current materialized view 509, the transformation function automatically replaces the deleted value with a NULL value; if transformation function 917 can make a one-to-one substitution, the transformation function makes the substitution automatically, both as shown by arrow 923. If there is more than one possible substitution, the value which is no longer present in current materialized view 509 is set to NULL and the deleted value and the possible substitutions are written to recommendation table 711. A user of the relational database system may then employ workstation 921 to select one of the possible substitutions to be written to constrained column 505, as shown at 925.

Finally the underlying conventional referential constraint is enabled. If the underlying constraint had an EXCEPTIONS clause (a clause which specifies a table into which constraint violations may be written), the clause is appended to the end of the constraint creation and has syntax of:

```
ALTER TABLE EMP
ADD CONSTRAINT dept_constraint
FOREIGN KEY (DNAME)
REFERENCES (SELECT Term1Name
    FROM TABLE( ONT_EXPAND( NULL,
    'rdfs:subClassOf ', 'Management',
    'Department Ontology')))
EXCEPTIONS INTO Ontology_Exceptions;
```

If the constraint enforcement is successful, the R0 result set can be dropped.

This method can also be used as part of a protocol to enforce the constraint during incremental ontology modifications. In this case the constraint would be disabled before the modification is started and enabled after the modification is completed.

Incremental Enforcement

When the materialized view changes incrementally along with incremental changes in the ontology, the conventional referential integrity constraint enforcement between the constrained table and the materialized view is altered to a deferred constraint (i.e., a constraint that's enforced only at transaction commit-time) with ON DELETE SET NULL semantics. With a deferred constraint spurious constraint violations during transient states that may exist as the materialized view changes are avoided.

Row-level triggers on the materialized view journal all changes in the constraint query result set to temporary journal table 511. A row-level update trigger on the constrained column is used to write orphaned values and their row's rowid to the recommendation table when the ON DELETE SET NULL behavior specified in the constraint definition sets an orphaned value to NULL. (If a keyword is updated to null by explicit Data Manipulation Language (DML) this trigger will log the keyword and its rowid to the recommendation table, however since there is no ontology update in this case the update will not be further processed by the constraint's refinement or translation mechanisms).

After the ontology has been modified (i.e., after changes to the underlying ontology tables have committed), journal table 511 is processed to remove idempotent operations (e.g., a term may be deleted and reinserted during materialized view maintenance). Then the appropriate calls are made to the constraint's refinement and transformation functions based on the remaining operations, and the results are propagated to the constrained column and the constraint's recommendation table.

Improved Incremental Enforcement

There are several problems with the above incremental enforcement implementation:

The ON DELETE SET NULL referential constraint may set keywords to NULL as the materialized view evolves through transient states, even though the keyword will not be orphaned when the maintenance is complete.

The journal table is processed as part of a follow-up transaction, and therefore any translations and recommendations made are not atomic with the changes to the ontology.

If it is not possible to refresh the materialized view because one of the objects it references has been dropped or altered then the user will see unexpected errors during commit (Note that this can also occur during batch enforcement).

To address these problems, we propose introducing AFTER REFRESH and AFTER REFRESH ERROR triggers on materialized views. Such triggers would run as part of the transaction that refreshes the materialized view.

With these triggers, we can improve the incremental enforcement scheme as follows:

The referential integrity constraint between the constrained column and the materialized view does not need ON DELETE SET NULL semantics, and the row-level update trigger on the constrained column is not needed.

In an AFTER REFRESH trigger on the materialized view, the journal table can be processed, the appropriate refinement and transformation function calls can be made, and the constrained column and recommendation table can be updated.

In an AFTER REFRESH ERROR trigger on the materialized view we can raise a helpful error, such as "ontology-based referential constraint query requires modification."

Generalization of Set Source Modification and Resulting Constraint Enforcement

The techniques described above for modifying the ontology, making a new materialized view from a query on the ontology, and altering values in the constrained column as required by the new materialized view can be applied with regard to constraint sets that are obtained in any way. Appropriate mechanisms will be of course required to obtain the constraint sets. For example, if the constraint set is obtained by a query executed in the database system, the proper query must be provided. Different sources for constraint sets will also require different transformation functions or no transformation functions at all.

CONCLUSION

The foregoing Detailed Description has disclosed to those skilled in the relevant technologies how to employ arbitrary sets of objects as constraints in database systems and has further disclosed the best mode presently known to the inventors of making constraints that use arbitrary sets of objects. While the specific example set forth in the Detailed Description employs constraints based on ontologies, the technique is very general and can be used with any set of objects that are accessible to a database system. To give an example of the generality of the techniques, the set of objects could be obtained via a table function that received the objects from a user of the database system.

While the techniques are very general, the preferred embodiment is implemented in an Oracle relational database management system and the character of many of the specific features of the preferred embodiment is determined in considerable part by the fact that they are implemented in a specific relational database system. Implementations of the techniques in other database systems, including non-relational database systems, will necessarily be determined by the characteristics of the database systems in which they are implemented. An apparatus includes a processor and a storage device as a storage medium.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

The invention claimed is:

1. A method of enforcing a referential integrity constraint between a constraint set and a constrained object in a relational database management system, the constraint set and the constrained object having values that are terms of an ontology and the method comprising the steps performed in the relational database management system of:
   receiving an ontology query, wherein the ontology query returns a set of terms of the ontology as the constraint set to be used to define the referential integrity constraint, wherein different constraint sets having different sets of terms can be derived by querying the same ontology;
   providing the referential integrity constraint for the constrained object, the constrained object comprising a constrained column that is defined in the relational database management system and the act of providing comprises:
   making a term object with a column wherein values in the column being the members of the returned set of terms; and
   using the column of the term object to define the referential integrity constraint for the constrained object;
   when an operation in the relational database management system adds a term to the constrained object, permitting the operation only if the added term belongs to the constraint set; and
   when a modification is performed on the ontology in the relational database management system that results in a different set of terms being returned by the ontology query, altering one or more values in the constrained object that are not contained in the different set of terms.

2. The method set forth in claim 1 wherein:
   the query uses an ontology function that is executed in the relational database management system.

3. The method set forth in claim 1 wherein:
   the term object comprises a materialized view.

4. The method set forth in claim 1 wherein:
   in the step of altering one or more values in the constrained object, when a term in the constrained object is no longer contained in the different set of terms, giving the term in the constrained object a null value.

5. The method set forth in claim 1 wherein:
   in the step of altering one or more values in the constrained object, when a term in the constrained object is no longer contained in the different set of terms, giving the term in the constrained object a default value.

6. The method set forth in claim 1 wherein:
   a transformation function is associated with the set of terms; and
   in the step of altering one or more values in the constrained object, when a term in the constrained object is no longer contained in the different set of terms using the transformation function to replace the term in the constrained object with one of the terms in the different set of terms.

7. The method set forth in claim 6 wherein the transformation function returns more than one term in the different set of terms that replaces the term in the constrained object and the method further includes the step of: selecting one of more than one terms to replace the term in the constrained object.

8. The method set forth in claim 7 wherein:
   in the step of selecting one of the more than one terms, the selection is made on the basis of input from a user of the relational database management system.

9. The method set forth in claim 1 wherein:
   the act of providing the referential integrity constraint includes specifying that no modification is to be performed in the relational database management system.

10. A non-transitory storage device having a set of stored instructions for enforcing a referential integrity constraint between a constraint set and a constrained object in a relational database management system, the constraint set and the constrained object having values that are terms of an ontology and an execution by a processor of a workstation causes a process to be perform, the process comprising:
    receiving an ontology query, wherein the ontology query returns a set of terms of the ontology as the constraint set to be used to define the referential integrity constraint, different constraint sets of the integrity constraint having different sets of terms can be derived by querying the same ontology;
    providing the referential integrity constraint for the constrained object, the constrained object comprising a constrained column that is defined in the relational database management system and the act of providing comprises:
    making a term object with a column, values in the column being the members of the returned set of terms; and
    using the column of the term object to define the referential integrity constraint for the constrained object;
    when an operation in the relational database management system adds a term to the constrained object, permitting the operation only if the added term belongs to the constraint set; and when a modification is performed on the ontology in the relational database management system that results in a different set of terms being returned by the ontology query, altering one or more values in the constrained object that are not contained in the different set of terms.

11. A non-transitory computer readable storage medium with program instructions for enforcing a referential integrity constraint between a constraint set and a constrained object in a relational database management system, the constraint set and the constrained object having values that are terms of an ontology, the medium comprising the instructions for:
receiving an ontology query and returning a set of terms of the ontology as the constraint set to be used to define the referential integrity constraint, wherein different constraint sets having different sets of terms can be derived by querying the same ontology; and
providing the referential integrity constraint for the constrained object, whereby when an operation in the relational database management system adds a value to the constrained object, permitting the operation only if the added value is a member of the set of terms, the constrained object comprising a constrained column that is defined in the relational database management system and the act of providing comprises:
making a term object with a column, values in the column being the members of the returned set of terms; and
using the column of the term object to define the referential integrity constraint for the constrained object; and
when a modification is performed on the ontology in the relational database management system that results in a different set of terms being returned by the ontology query, altering one or more values in the constrained object that are not contained in the different set of terms.

12. The medium set forth in claim 11 wherein:
the query uses an ontology function that is executed in the relational database management system.

13. The medium set forth in claim 11 wherein:
The term object comprises
a materialized view.

14. The medium set forth in claim 11 wherein:
in the altering of one or more values, when a term in the constrained object is no longer contained in the different set of terms, giving the term in the constrained object a null value.

15. The medium set forth in claim 11 wherein:
in the altering of one or more values, when a term in the constrained object is no longer contained in the different set of terms, giving the term in the constrained object a default value.

16. The medium set forth in claim 11 wherein:
a transformation function is associated with the set of terms; and
in the altering of one or more values, when a term in the constrained object is no longer contained in the different set of terms using the transformation function to replace the term in the constrained object with one of the terms in the different set of terms.

17. The medium set forth in claim 16 wherein
the transformation function returns more than one term in the different set of terms that replaces the term in the constrained object and the instructions further comprises: selecting one of more than one terms to replace the term in the constrained object.

18. The medium set forth in claim 16 wherein:
in the selecting of one of the more than one terms, the selection is made on the basis of input from a user of the relational database management system.

19. The medium set forth in claim 11 wherein:
the act of providing of the referential integrity constraint includes specifying that no terms in the constrained object are to be altered when a different set of terms is returned by the query,
the instructions further responding to the different set of terms and to a specification that no terms of in the constrained object are to be altered by not altering any term in the constrained object.

20. An apparatus for enforcing a referential integrity constraint between a constraint set of objects and constrained object having values that are terms of an ontology in a relational database management system, the objects in the constraint set being possible values in the constrained object and the relational database management system being implemented in a workstation having a processor and a storage device to which the processor has access and the apparatus comprising:
the storage device having an association between the constrained object and the constraint set of objects, the constraint set of objects having been returned by an ontology query that is executed in the relational database system and returns the objects in the constraint set to be used to define the referential integrity constraint, wherein different constraint sets can be derived by querying the same ontology, the constrained object comprising a constrained column that is defined in the relational database management system;
the constraint set associated with the constrained object is a term object with a column, values in the column being the members of the constraint set; and
a referential integrity constraint for the constrained object which references the column in the term object; and
the processor for executing a constraint enforcer which, when an operation in the relational database management system adds a value to the constrained object, permits the operation only if the added value is a member of the constraint set, and when a modification is performed on the ontology in the relational database management system that results in a different set of values being returned by the ontology query, altering one or more values in the constrained object that are not contained in the different set of values.

21. The apparatus set forth in claim 20 wherein:
the query employs a table function.

22. The apparatus set forth in claim 20 wherein
the term object comprises
a materialized view.

23. The apparatus set forth in claim 20 wherein:
when a value in the constrained object is no longer contained in the different constraint set, the apparatus that alters one or more values sets the one or more values to a null value.

24. The apparatus set forth in claim 20 wherein:
when a value in the constrained object is no longer contained in the different constraint set, the apparatus that alters one or more values sets the one or more values to a default value.

25. The apparatus set forth in claim 20 further comprising:
a transformation function that is associated with the constraint set; and
when a value in the constrained object is no longer contained in the different constraint set, the apparatus that alters one or more values applies the transformation function to the one or more values.

26. The apparatus set forth in claim 25 wherein:
the transformation function returns more than one value in the different constraint set that replaces the value in the constrained object; and the apparatus that alters one or more values selects one of more than one values returned by the transformation function to replace the value in the constrained object.

27. The apparatus set forth in claim 26 wherein:
the apparatus that alters one or more values selects the one value on the basis of input from a user of the relational database management system.

28. The apparatus set forth in claim 20 wherein:
the association between the constrained object and the constraint set can specify that the relational database management system will not perform an operation that results in the different constraint set.

29. Apparatus for enforcing a referential integrity constraint between a constraint set and a constrained object in a relational database management system, the constraint set and the constrained object having values that are terms of an ontology, the relational database management system being implemented in a workstation having a processor and a storage device to which the processor has access, and the apparatus comprising:
the storage device having an association between the constrained object and an ontology query, wherein the ontology query returns a set of terms of the ontology, the returned terms being the constraint set to be used to define the referential integrity constraint, wherein different constraint sets having different sets of terms can be derived by querying the same ontology, the constrained object comprising a constrained column that is defined in the relational database management system;
the set of terms associated with the constrained object is a term object with a column, values in the column being the set of terms; and
a referential integrity constraint for the constrained column which references the column in the term object; and
the processor for executing a constraint enforcer in the relational database management system which, when an operation in the relational database management system adds a value to the constrained object, permits the operation only if the added value is a value belonging to the constraint set, and when a modification is performed on the ontology in the relational database management system that results in a different set of terms being returned by the ontology query, altering one or more values in the constrained object that are not contained in the different set of terms.

30. The apparatus set forth in claim 29 wherein:
the query uses an ontology function that is executed in the relational database management system.

31. The apparatus set forth in claim 29 wherein
the term object comprises
a materialized view.

32. The apparatus set forth in claim 29 wherein:
when a term in the constrained object is no longer contained in the different set of terms, the apparatus that alters one or more values sets the one or more terms to a null value.

33. The apparatus set forth in claim 29 wherein:
when a term in the constrained object is no longer contained in the different set of terms, the apparatus that alters one or more values sets the one or more terms to a default value.

34. The apparatus set forth in claim 29 further comprising:
a transformation function that is associated with the set of terms; and
when a term in the constrained object is no longer contained in the different set of terms, the apparatus that alters one or more values applies the transformation function to the one or more terms.

35. The apparatus set forth in claim 34 wherein:
the transformation function returns more than one term in the different set of terms that replaces the term in the constrained object; and
the apparatus that alters one or more values selects one of more than one terms returned by the transformation function to replace the term in the constrained object.

36. The apparatus set forth in claim 35 wherein:
the apparatus that alters one or more values selects the one term on the basis of input from a user of the relational database management system.

37. The apparatus set forth in claim 29 wherein:
the association between the constrained object and the set of terms can specify that the relational database management system will not perform an operation that results in the different set of terms.

* * * * *

UNITED STATES PATENT AND TRADEMARK OFFICE
CERTIFICATE OF CORRECTION

PATENT NO. : 8,214,354 B2
APPLICATION NO. : 11/395652
DATED : July 3, 2012
INVENTOR(S) : Chong et al.

It is certified that error appears in the above-identified patent and that said Letters Patent is hereby corrected as shown below:

On the Title page, Item (56) under "Other Publications", line 14, delete "www.hpt.Itechreports" and insert -- www.hpt.hp.Itechreports --, therefor.

On Title page 2, Item (56) under "Other Publications", line 2, delete "2004;" and insert -- 2004, --, therefor.

On Title page 2, Item (56) under "Other Publications", line 4, delete "Gateway" and insert -- Gateway, --, therefor.

On Title page 2, Item (56) under "Other Publications", line 7, delete "Langauge" and insert -- Language --, therefor.

On Title page 2, Item (56) under "Other Publications", line 12, delete "Emantic" and insert -- Semantic --, therefor.

On Title page 2, Item (56) under "Other Publications", line 5, delete "Seraching" and insert -- Searching --, therefor.

On sheet 4 of 9, in figure 4, Reference Numeral 401, line 9, delete "Deparment" and insert -- Department --, therefor.

On sheet 4 of 9, in figure 4, Reference Numeral 423, line 3, delete "checmical" and insert -- chemical --, therefor.

On sheet 6 of 9, in figure 6, Reference Numeral 601, line 9, delete "Deparment" and insert -- Department --, therefor.

On sheet 6 of 9, in figure 6, Reference Numeral 605, line 9, delete "Deparment" and insert -- Department --, therefor.

Signed and Sealed this
Second Day of October, 2012

David J. Kappos
*Director of the United States Patent and Trademark Office*

CERTIFICATE OF CORRECTION (continued)
U.S. Pat. No. 8,214,354 B2

On sheet 6 of 9, in figure 6, Reference Numeral 625, line 9, delete "Deparment" and insert -- Department --, therefor.

In column 9, line 29, delete "$R_{new}$)" and insert -- $R_{new}$, --, therefor.

In column 11, line 48, delete "'Department Ontology'" and insert -- 'Department_Ontology' --, therefor.

In column 15, line 33, in Claim 13, delete "The" and insert -- the --, therefor.

In column 15, line 60, in Claim 18, after selecting, delete "of one of the" and insert -- one of --, therefor.

In column 16, line 2, in Claim 19, delete "of in" and insert -- in --, therefor.